(12) United States Patent
Eun et al.

(10) Patent No.: US 12,406,100 B2
(45) Date of Patent: Sep. 2, 2025

(54) STORAGE DEVICE INCLUDING STORAGE CONTROLLER AND OPERATING METHOD

(71) Applicant: SAMSUNG ELECTRONICS CO., LTD., Suwon-si (KR)

(72) Inventors: Heeseok Eun, Hwaseong-si (KR); Sooyoung Ji, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 227 days.

(21) Appl. No.: 17/895,349

(22) Filed: Aug. 25, 2022

(65) Prior Publication Data
US 2023/0135891 A1    May 4, 2023

(30) Foreign Application Priority Data

Nov. 1, 2021  (KR) .................. 10-2021-0148126

(51) Int. Cl.
*G06F 21/79*    (2013.01)
*G06F 21/60*    (2013.01)
(Continued)

(52) U.S. Cl.
CPC ............ *G06F 21/79* (2013.01); *G06F 21/602* (2013.01); *G06F 21/6227* (2013.01); *G06N 20/00* (2019.01)

(58) Field of Classification Search
None
See application file for complete search history.

(56) References Cited

U.S. PATENT DOCUMENTS 9,076,018 B2    7/2015  Johnson
9,626,531 B2    4/2017  Natarajan et al.
(Continued)

FOREIGN PATENT DOCUMENTS

CN          107070649 A    8/2017
KR     10-2016-0080742     7/2016
(Continued)

OTHER PUBLICATIONS

Vizitiu Anamaria et al: "Applying Deep Neural Networks over Homomorphic Encrypted Medical data", Computational and Mathematical Methods in Medicine, [Online] vol. 2020, Apr. 9, 2020 (Apr. 9, 2020, pp. 1-26, XP055812079, ISSN : 1748-670X, DOI: 10.1155/2020/3910250.

(Continued)

*Primary Examiner* — Nicholas R Taylor
*Assistant Examiner* — Tania M Pena-Santana
(74) *Attorney, Agent, or Firm* — Fish & Richardson P.C.

(57) ABSTRACT

An operating method for a storage device including a storage controller and a non-volatile memory may include; receiving a command including data and a field related to the data from a host, determining an operation mode based on the command, selectively encrypting the data based on the operation mode to generate selectively encrypted data, and storing the selectively encrypted data in the non-volatile memory, wherein the selectively encrypting of the data includes encrypting the data based on a first encryption algorithm when the operation mode is a first operation mode, and encrypting the data based on a second encryption algorithm different from the first encryption algorithm when the operation mode is a second operation mode.

19 Claims, 13 Drawing Sheets

(51) Int. Cl.
*G06F 21/62* (2013.01)
*G06N 20/00* (2019.01)

(56) References Cited

U.S. PATENT DOCUMENTS

| | | | |
|---|---|---|---|
| 9,710,658 | B2 | 7/2017 | Ali et al. |
| 9,990,162 | B2 * | 6/2018 | Kim .................... G06F 3/0679 |
| 10,560,257 | B2 | 2/2020 | Hoffstein et al. |
| 10,698,838 | B2 | 6/2020 | Isozaki et al. |
| 10,893,407 | B2 | 1/2021 | Jolibois et al. |
| 11,005,645 | B2 | 5/2021 | Hirano et al. |
| 11,032,259 | B1 | 6/2021 | Bernat et al. |
| 2015/0326511 | A1 * | 11/2015 | Chiu .................... H04L 51/214 726/7 |
| 2015/0371055 | A1 * | 12/2015 | Park ...................... G06F 21/85 713/165 |
| 2018/0219674 | A1 * | 8/2018 | Mullins ................. H04L 9/0861 |
| 2018/0322383 | A1 * | 11/2018 | Feng ...................... G06N 3/04 |
| 2019/0244138 | A1 | 8/2019 | Bhowmick et al. |
| 2020/0136798 | A1 * | 4/2020 | Kim ........................ H04L 9/008 |
| 2020/0320020 | A1 | 10/2020 | Lea |
| 2021/0126768 | A1 | 4/2021 | Kim et al. |

FOREIGN PATENT DOCUMENTS

| | | |
|---|---|---|
| KR | 10-1869067 | 6/2018 |
| KR | 10-2018-0095844 | 8/2018 |
| KR | 10-2213819 | 2/2021 |
| KR | 10-2021-0049378 | 5/2021 |

OTHER PUBLICATIONS

Kim Bongjun et al: "Compiler-Assisted Semantic-Aware Encryption for Efficient and Secure Serverless Computing", IEEE Internet of Things Journal, IEEE, USA, vol. 8,No. 7, Oct. 16, 2020 (Oct. 16, 2020), pp. 5645-5656, XP011845855, DOI: 10.1109/JIOT.2020.3031550 [retrieved on Mar. 23, 2021].
European Search Report Dated Mar. 30, 2023, Cited in EP Patent Application No. 22199508.7.
Jason Moigaard, "A Simple Approach to Implementing Computational Storage", SDC 19, Sep. 26, 2019.

* cited by examiner

STORAGE DEVICE INCLUDING STORAGE CONTROLLER AND OPERATING METHOD

CROSS-REFERENCE TO RELATED APPLICATION

This application claims priority under 35 U.S.C. § 119 to Korean Patent Application No. 10-2021-0148126 filed on Nov. 1, 2021 in the Korean Intellectual Property Office, the subject matter of which is hereby incorporated by reference in its entirety.

BACKGROUND

The inventive concept relates generally to storage devices, and more particularly, to storage devices capable of selectively encrypting data in response to command(s) received from a host.

Accelerator circuits such as graphics processing units (GPUs) and field programmable gate arrays (FPGAs) may be used to perform various computations such as those associated with artificial intelligence (AI) or machine learning.

However, certain large-scale data operations may drastically effect the sped of data transfer between a central processing unit (CPU) and a storage device. Thus, some data operation associated with the storage device may be performed using an accelerator circuit in the storage device. In addition, the storage device may store encrypted data to ensure data security.

SUMMARY

Embodiments of the inventive concept provide storage devices capable of selectively encrypting data in accordance with a command field. Embodiments of the inventive concept also provide operating methods for such storage devices.

According to an aspect of the inventive concept, an operating method for a storage device may include; receiving a command including data and a field related to the data from a host, determining an operation mode based on the command, selectively encrypting the data based on the operation mode to generate selectively encrypted data, and storing the selectively encrypted data in the non-volatile memory, wherein the selectively encrypting of the data includes encrypting the data based on a first encryption algorithm when the operation mode is a first operation mode, and encrypting the data based on a second encryption algorithm different from the first encryption algorithm when the operation mode is a second operation mode.

According to an aspect of the inventive concept, an operating method for a storage device may include; receiving a command including data and a filed related to the data from a host, selectively encrypting the data using either a first encryption algorithm or a second encryption algorithm to generate selectively encrypted data, wherein the first encryption algorithm is a homomorphic encryption algorithm and the second encryption algorithm is one of a symmetric key encryption algorithm and an asymmetric key encryption algorithm, and storing the selectively encrypted data in the non-volatile memory, wherein the command includes at least one of a first field indicating whether computation on the data is to be performed and a second field indicating whether the data is encrypted data.

According to an aspect of the inventive concept, an operating method for a storage device may include; receiving a write command and write data form a host, wherein the write command includes a first field indicating whether a computation on the write data is to be performed and a second field indicating whether the write data is encrypted, determining one of a first operation mode, a second operation mode and a third operation mode in response to at least one of the first field and the second field, selectively encrypting the write data using a first encryption algorithm to generate first encrypted data upon determining the first operation mode, or selectively encrypting the write data using a second encryption algorithm different from the first encryption algorithm to generate second encrypted data upon determining the second operation mode, or omitting encryption of the write data to generate third encrypted data upon determining the third operation mode, and storing one of the first encrypted data, the second encrypted data and the third encrypted data in the non-volatile memory.

According to an aspect of the inventive concept, a storage controller for a storage system may include; a first encryption circuit configured to encrypt data using a first encryption algorithm to generate first encrypted data, a second encryption circuit configured to encrypt data using a second encryption algorithm to generate second encrypted data, and a first interface circuit configured to receive a command and data from a host, and communicate the data to one of the first encryption circuit, the second encryption circuit and a second interface circuit based on a first field and a second field included in the command, wherein the second interface circuit is configured to communicate at least one of the first encrypted data, the second encrypted data and third encrypted data to a non-volatile memory.

BRIEF DESCRIPTION OF THE DRAWINGS

Advantages, benefits, objects and features, as well as the making and use of the inventive concept, may be more clearly understood upon consideration of the following detailed description together with the accompanying drawings in which.

DETAILED DESCRIPTION

Throughout the written description and drawings, like or similar numbers and labels are used to denote like or similar elements, components, features and/or method steps.

Figure 1:
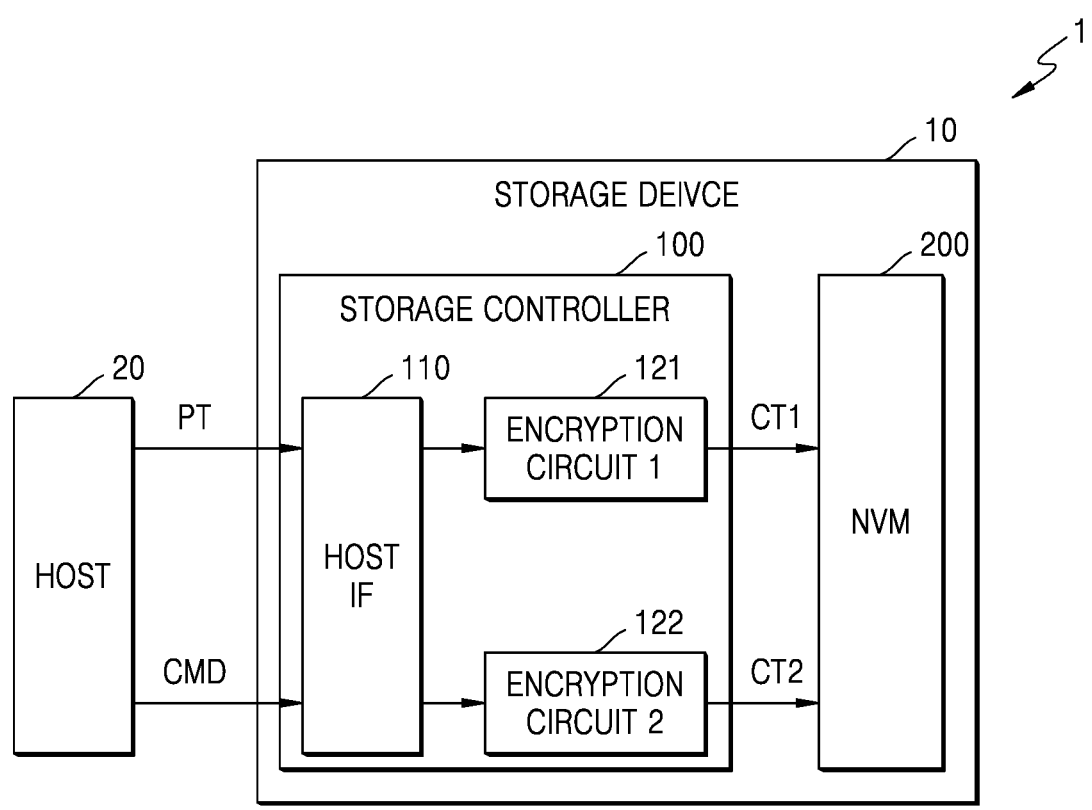
FIG. 1 is a block diagram illustrating a storage system according to embodiments of the inventive concept.

FIG. 1 is a block diagram illustrating a storage system 1 according to embodiments of the inventive concept.

Referring to FIG. 1, the storage system 1 may generally include a host 20 and a storage device 10, wherein the storage device 10 may include a storage controller 100 and a nonvolatile memory (NVM) 200.

The host 20 may provide one or more command(s) (hereafter singularly or collectively, "command CMD") to the storage device 10. Those skilled in the art will appreciate that the command CMD may be one or more of a read command, a write (or program) command, an erase command, a house-keeping command, etc. Thus, in response to a write command received from the host 20, the storage device 10 may to store data (e.g., plain text PT or unencrypted data). Thereafter, in response to a read command received from the host 20, the storage device 10 retrieve and provide the plain text PT.

The storage device 10 may include storage media (e.g., NVM 200) capable of storing data in response to the command CMD received from the host 20. In some embodiments, the storage device 10 may include at least one of a solid state drive (SSD), an embedded memory, a removable external memory, etc. Assuming that the storage device 10 includes a SSD, the storage device 10 may operate in a manner conforming to technical standards associated with a non-volatile memory express (NVMe). Assuming that the storage device 10 includes an embedded memory or an external memory, the storage device 10 may operate in a manner conforming to technical standards associated with a universal flash storage (UFS) or an embedded multi-media card (eMMC) standard.

In some embodiments, the host 20 and the storage device 10 may generate, communicate and/or receive (hereafter singularly or collectively, "communicate") packet(s) conforming to technical standards associated with one or more conventionally understood and/or commercially available data communications protocols.

The NVM 200 may include a flash memory (e.g., a two-dimensional (2D) NAND memory array or a three-dimensional (3D) or vertical NAND (VNAND) memory array). Alternately or additionally, the storage device 10 may include magnetic random access memory (RAM) (MRAM), spin-transfer torque MRAM, conductive bridging RAM (CBRAM), ferroelectric RAM (FeRAM), phase RAM (PRAM), resistive memory (resistive RAM), etc.

The storage controller 100 may include a host interface 110, a first encryption circuit 121, and a second encryption circuit 122.

The host interface 110 may be used to communicate one or more packet(s) (hereafter singularly or collectively, "packet") between the host 20 and the storage device 10. A packet communicated from the host 20 to the host interface 110 may include a command CMD and/or data (e.g., plain text PT) to be written to the NVM 200. A packet communicated from the host interface 110 to the host 20 may include a response to a previously received command and/or read data retrieved from the NVM 200. In some embodiments, the host interface 110 may communicate plain text PT to the first encryption circuit 121 and/or the second encryption circuit 122 in accordance with (or "based on") a field related to data included in the command CMD (hereafter, a "command field").

The first encryption circuit 121 may generate a first ciphertext CT1 by encrypting the plain text PT using a first encryption algorithm, and may decrypt the first ciphertext CT1 using the first encryption algorithm. In some embodiments, the first encryption algorithm may be a homomorphic encryption algorithm. The first encryption algorithm may provide a ciphertext on which one or more computation(s) have been performed. That is, the decrypted data generated by decrypting a computation (e.g., an arithmetic or logic operation) result on the first ciphertext CT1 may be the same as a computation result associated with the plain text PT. That is, security of the plain text PT may be maintained and computation may be performed using the first ciphertext CT1.

The second encryption circuit 122 may generate a second ciphertext CT2 by encrypting the plain text PT using a second encryption algorithm, and may decrypt the second ciphertext CT2 using the second encryption algorithm. In some embodiments, the second encryption algorithm may be a symmetric key algorithm or an asymmetric key algorithm. The second encryption algorithm may be a relatively simple encryption/decryption algorithm and may be used to provide a relatively fast encryption/decryption speed. Accordingly, when the plain text PT is encrypted using the second encryption algorithm, performance of various interface circuitry between the host 20 and the storage device 10 may be improved.

In some embodiments, the host interface 110 may respectively communicate the plain text PT based on a first field of the command CMD (e.g., a "first field") or a second field of the command CMD (e.g., a second field") to either the first encryption circuit 121 or the second encryption circuit 122.

The first field may include information indicating whether or not a computation will be performed on data received from the host 20. For example, when the first field includes a "1", the storage device 10 may perform, for example, an arithmetic operation on data received from the host 20, a learning operation associated with a machine learning program, or an inference operation associated with the machine learning program. However, when the first field includes a "0", the storage device 10 may not perform the foregoing arithmetic operation, learning operation, or inference operation.

The second field may include information indicating whether or not data received from the host 20 is plain text PT (unencrypted data) or encrypted data. For example, when the second field includes a "1", the data received from the host 20 may be unencrypted plain text, and when the second field includes a "0", the data received from the host 20 may be a ciphertext.

Figure 2:
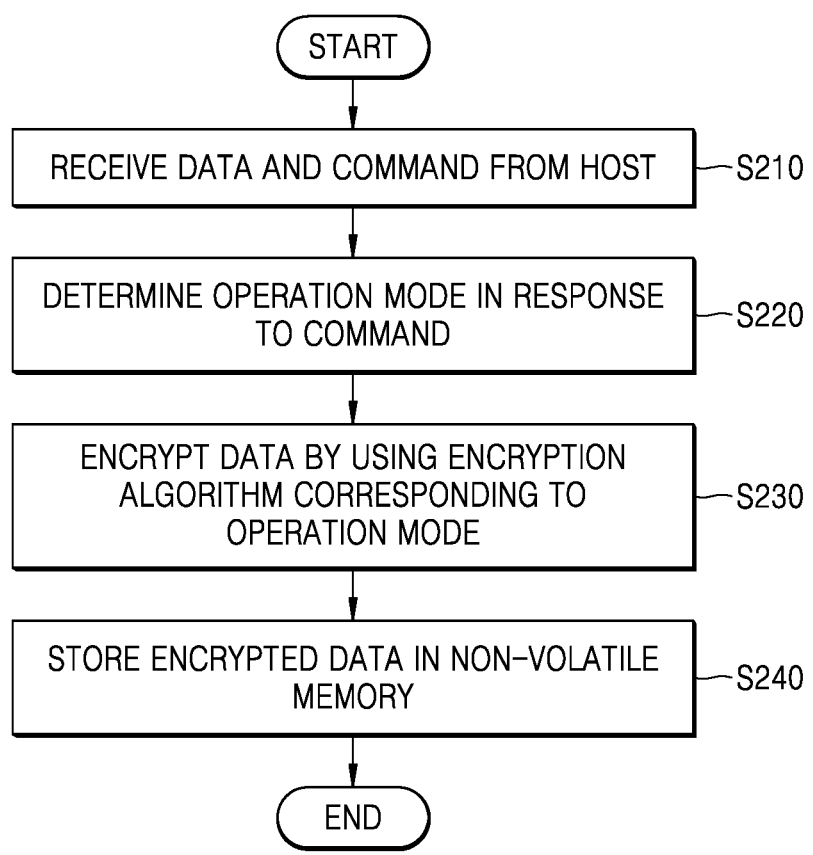
FIG. 2 is a flowchart illustrating an operating method for a storage device according to embodiments of the inventive concept.

FIG. 2 is a flowchart illustrating an operating method for a storage device according to embodiments of the inventive concept. Here, the example illustrated in FIG. 2 assumes a write operating method applied to the storage device 10 of FIG. 1.

Referring to FIGS. 1 and 2, the host interface 110 of the storage device 10 may receive write data and a command from the host 20 (S210), wherein the write data may be unencrypted plain text or a ciphertext. Accordingly, the command may include at least one field associated with the data. In some embodiments, the command may include a first field or a second field, wherein the first field indicates whether or not a computation on data should be performed, and the second field indicates whether or not the data is encrypted.

The storage device 10 may then determine an operation mode based on the at least one command field (S220). That is, the host interface 110 may identify the first field or the second field included in the command, and the storage device 10 may determine the operation mode based on the information stored in the first field or the second field. For example, when the second field indicates that data is not encrypted and the first field indicates that computation on data is performed, the storage device 10 may operate in a first operation mode to generate first encrypted data. When the second field indicates that data is not encrypted and the first field indicates that no computation on data is performed, the storage device 10 may operate in a second operation mode to generate second encrypted data. And when the second field indicates that data is already encrypted, the storage device 10 may operate in a third operation mode to generate third encrypted data.

Thus, the storage device 10 may selectively encrypt write data received from the host 20 using an encryption algorithm corresponding to the determined operation mode (S230). For example, in the first operation mode, the host interface 110 may communicate the write data to the first encryption circuit 121, and the first encryption circuit 121 may encrypt the write data using the first encryption algorithm to generate the first encrypted data. In the second operation mode, the host interface 110 may communicate the write data to the second encryption circuit 122, and the second encryption circuit 122 may encrypt the write data using the second encryption algorithm to generate second encrypted data. And in the third operation mode, the host interface 110 may omit encryption of the write data (e.g., the write data received from the host 20 may have been previously encrypted) by either the first or second encryption circuits 121 and 122 to generate the third encrypted data.

The storage device 10 may then store the encrypted write data—as first encrypted data, second encrypted data, or third encrypted data—in the NVM 200 (S240). For example, in the first operation mode, the write data encrypted by the first encryption circuit 121 may be stored in the NVM 200. In the second operation mode, the write data encrypted by the second encryption circuit 122 may be stored in the NVM 200. In the third operation mode, write data received by the host interface 110 may be stored in the NVM 200. In some embodiments, the storage device 10 may store not only the encrypted write data, but also information indicated in the first field and/or the second field of the command in the NVM 200. That is, the storage device 10 may also store operating mode information in the NVM 200.

Figure 3:
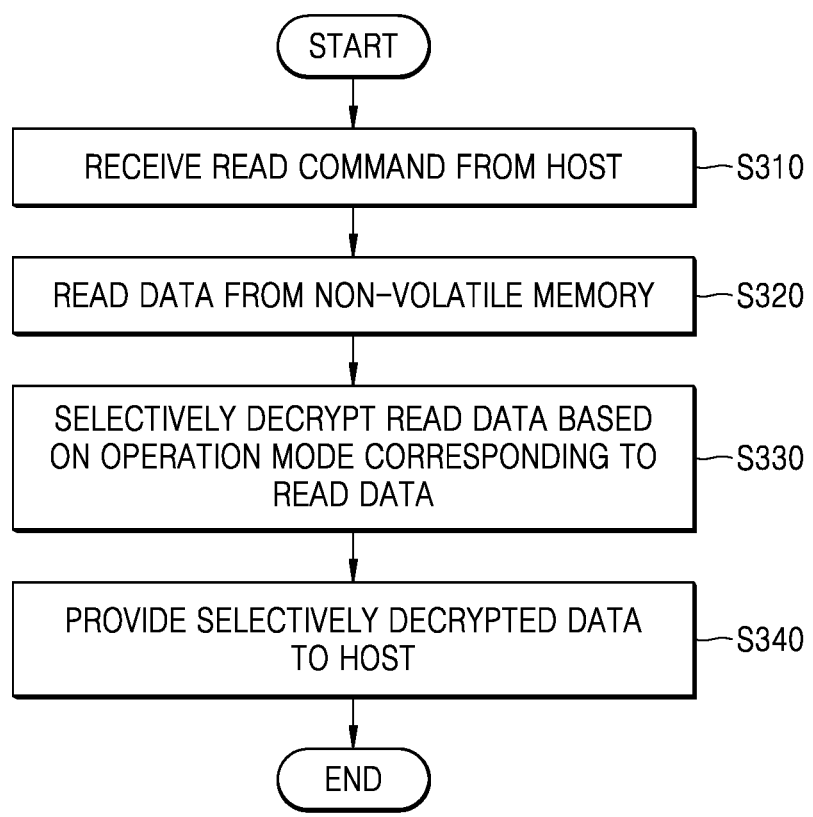
FIG. 3 is a flowchart illustrating an operating method for a storage device according to embodiments of the inventive concept.

FIG. 3 is a flowchart illustrating an operating method for a storage device according to an embodiments of the inventive concept. Here, the example illustrated in FIG. 3 assumes a read operating method applied to the storage device 10 of FIG. 1.

Referring to FIGS. 1 and 3, the storage device 10 may receive a read command from the host 20 via the host interface 110 (S310). The storage device 10 may receive not only a read command, but also an address indicating a location of the read data in the NVM 200.

In response, the storage device 10 may retrieve the read data from the NVM 200 (S320). The read data may be temporarily stored in a buffer memory (not illustrated). In some embodiments, the storage device 10 may read not only the read data, but also information indicating an operation mode from the NVM 200. That is, the storage device 10 may read from the NVM 200 information indicated in the first field and/or second field corresponding to the read data.

The storage device 10 may then selectively decrypt the read data based on an operation mode corresponding to the read data (S330). That is, the storage device 10 may determine an operation mode corresponding to the read data based on the information of the first field and/or the second field corresponding to the read data. In a first operation mode, the storage device 10 may decrypt the read data using the first encryption algorithm. In a second operation mode, the storage device 10 may decrypt the read data using the second encryption algorithm, and in a third operation mode, the storage device 10 may omit decryption of the read data.

Then, the storage device 10 may provide the selectively decrypted data to the host 20 (S340). That is, in the first operation mode, the storage device 10 may provide data decrypted using the first encryption algorithm to the host 20. In the second operation mode, the storage device 10 may provide data decrypted using the second encryption algorithm to the host 20. In the third operation mode, the storage device 10 may provide data read from the NVM 200 to the host 20.

Figure 4:
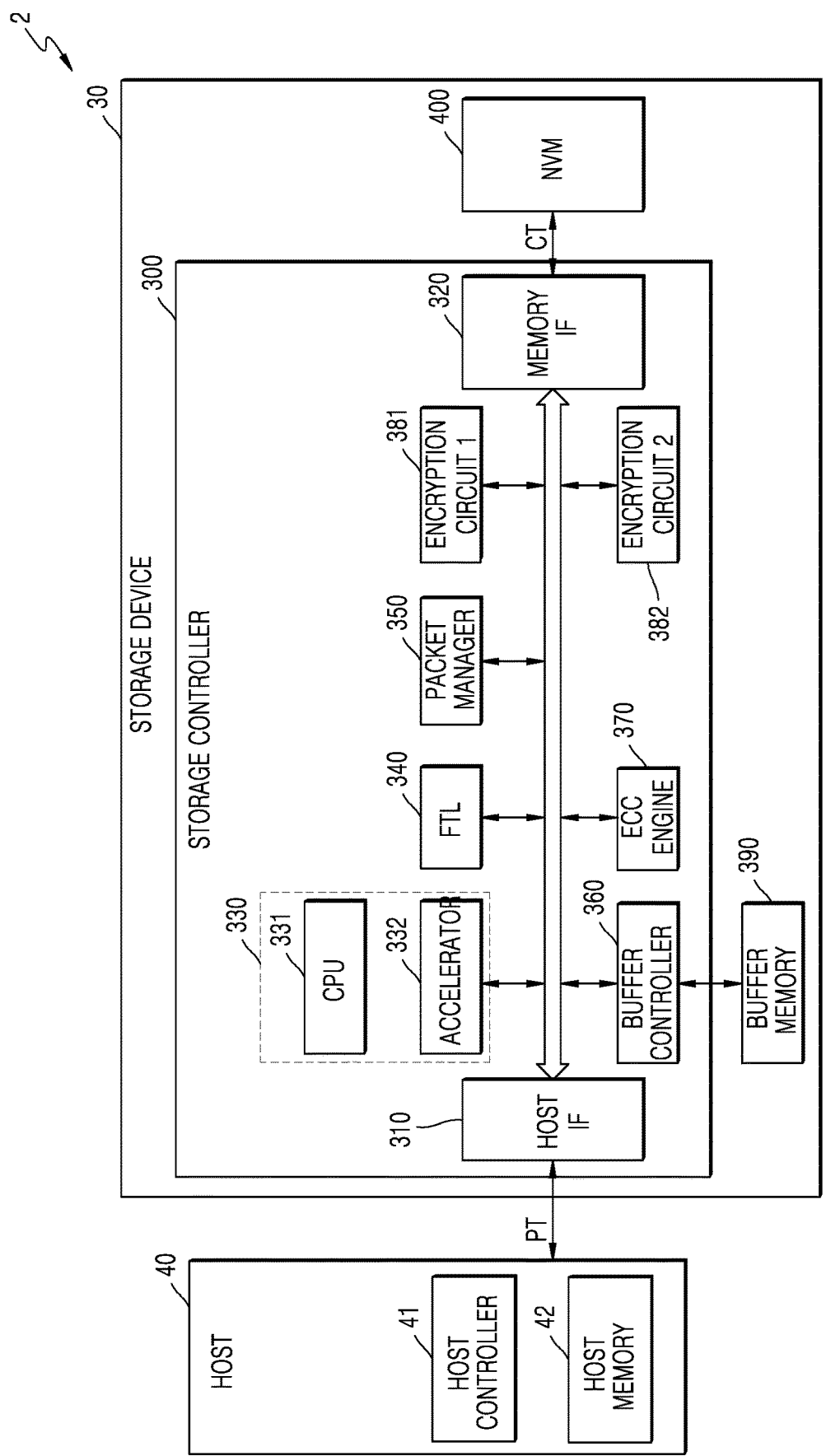
FIG. 4 is a block diagram illustrating a storage system according to embodiments of the inventive concept.

FIG. 4 is a block diagram illustrating a storage system 2 according to embodiments of the inventive concept.

Referring to FIG. 4, the storage system 2 may generally include a host 40 and a storage device 30. In some embodiments, the host 40 may include a host controller 41 and a host memory 42, wherein the host memory 42 functions as a buffer memory to temporarily store write data communicated to the storage device 30 and/or read data communicated from the storage device 30.

In some embodiments, the host controller 41 and the host memory 42 may be implemented as separate semiconductor chips. Alternately, the host controller 41 and the host memory 42 may be integrated into a single semiconductor chip. For example, the host controller 41 may implement one or more of a plurality of modules included in an application processor, wherein the application processor is implemented as a System on Chip (SoC). In addition, the host memory 42 may include an embedded memory provided in the application processor or may include a non-volatile memory or a memory module outside the application processor.

The host controller 41 may be used to manage write operations and read operations in relation to a storage controller 300 and a non-volatile memory (NVM) 400 of the storage device 30.

The storage controller 300 may include a host interface 310, a memory interface 320, and a storage processor 330. In addition, the storage controller 300 may include a flash translation layer (FTL) 340, a packet manager 350, a buffer controller 360, an error correction code (ECC) engine 370, a first encryption circuit 381, and a second encryption circuit 382. The storage controller 300 may include a working memory (not illustrated) into which the FTL 340 may be loaded. Accordingly, as the storage processor 330 may implement the FTL 340, write and read operations performed in relation to the NVM 400 may be controlled by the storage controller 300.

The memory interface 320 may communicate write data received from the host 40 to the NVM 400 and/or communicate read data received from the NVM 400 to the host 40. The memory interface 320 may be implemented to conform with technical standards associated with one or more data communications protocols such as Toggle or Open NAND Flash Interface (ONFI). In some embodiments, the memory interface 320 may communicate a ciphertext CT encrypted by the first encryption circuit 381 or the second encryption circuit 382 to the NVM 400, as well as receive a ciphertext CT retrieved from the NVM 400.

The FTL 340 may be used in conjunction with certain functions, such as address mapping, wear-leveling, and garbage collection. Here, address mapping may be understood as an operation whereby logical address(es) received from the host 40 are converted into corresponding physical address(es) associated with the NVM 400. Wear-leveling is a data storing approach that prevents degradation of specified block(s) among a plurality of blocks in the NVM 400 due to non-uniform block usage. In some embodiments, wear-leveling may be implemented using firmware to balance erase counts associated with the plurality of blocks. Garbage collection is memory space management approach that seeks to maximize the useable data storage capacity of the NVM 400 by copying (or consolidating) valid data from one or more blocks into a new block, and then erasing one or more blocks to generate one or more new blocks.

The packet manager 350 may be used to generate a packet according to a protocol of an interface negotiated with the host 40 or may parse various types of information from a packet received from the host 40. In addition, the buffer controller 360 may control data temporarily stored in the buffer memory 390 prior to exported outside of the storage controller 300. That is, write data to-be-written in the NVM 400 and/or read data retrieved from the NVM 400 may be temporarily stored in the buffer memory 390 under the control by the buffer controller 360. As illustrated in FIG. 4, the buffer memory 390 may be provided in the storage controller 300 but may also be outside the storage controller 300.

The ECC engine 370 may perform an error detection and correction function on read data retrieved from the NVM 400. That is, the ECC engine 370 may generate parity bits for write data to be written to the NVM 400, wherein the generated parity bits may be stored in the NVM 400 together with the write data. When data is subsequently read from the NVM 400, the ECC engine 370 may correct error(s) in the resulting read data using the parity bits read from the NVM 400 together with the read data. In this manner, error-corrected read data may be generated.

The first encryption circuit 381 may encrypt the plain text PT using the first encryption algorithm, wherein, in some embodiment, the first encryption algorithm is a homomorphic encryption algorithm. The first encryption circuit 381 may perform at least one of an encryption operation and a decryption operation on the plain text PT received by the host interface 310 using the first encryption algorithm. For example, the first encryption circuit 381 may generate the ciphertext CT by encrypting plain text PT. The ciphertext CT generated by the first encryption circuit 381 may be temporarily stored in the buffer memory 390 under the control by the buffer controller 360, and may then be provided to the memory interface 320.

The second encryption circuit 382 may encrypt plain text PT using the second encryption algorithm, wherein, in some embodiments, the second encryption algorithm is a symmetric key algorithm. The second encryption circuit 382 may perform at least one of an encryption operation and a decryption operation on the plain text PT received by the host interface 310 using the second encryption algorithm. The ciphertext CT generated by the second encryption circuit 382 may be temporarily stored in the buffer memory 390 under the control by the buffer controller 360, and may then be provided to the memory interface 320.

The storage processor 330 may include a central processing unit (CPU) 331 including one or more CPU cores. The storage processor 330 may further include an accelerator 332 (e.g., a dedicated circuit for high-speed data operations such as AI data operations). The accelerator 332 may include a graphics processing unit (GPU), a neural processing unit (NPU), a data processing unit (DPU), a field programmable gate array (FPGA), etc., and may be implemented by a chip physically separate from the CPU 331.

The accelerator 332 may perform computation on data stored in the NVM 400. That is, the accelerator 332 may perform not only arithmetic operation(s) (e.g., addition, subtraction, multiplication etc.), but also training operation(s) (e.g., machine learning or inference operation(s) associated with machine learning). The accelerator 332 may perform computation on the encrypted ciphertext based on the first encryption algorithm. In some embodiments, the accelerator 332 may perform a training operation of machine learning using the first ciphertext CT1 loaded into the buffer memory 390 from the NVM 400. The accelerator 332 may generate learning parameters of a learning model through a training operation and may temporarily store the learning parameters in the buffer memory 390 or the NVM 400. In some embodiments, the accelerator 332 may also perform an inference operation of machine learning based on the learning parameters. For example, during the inference operation, the storage controller 300 may receive inference target data from the host 40 and encrypt the inference target data using the first encryption algorithm. Thereafter, the accelerator 332 may generate output data according to the learning model from the inference target data based on the learning parameters. The storage controller 300 may provide output data to the host 40.

Figure 5:
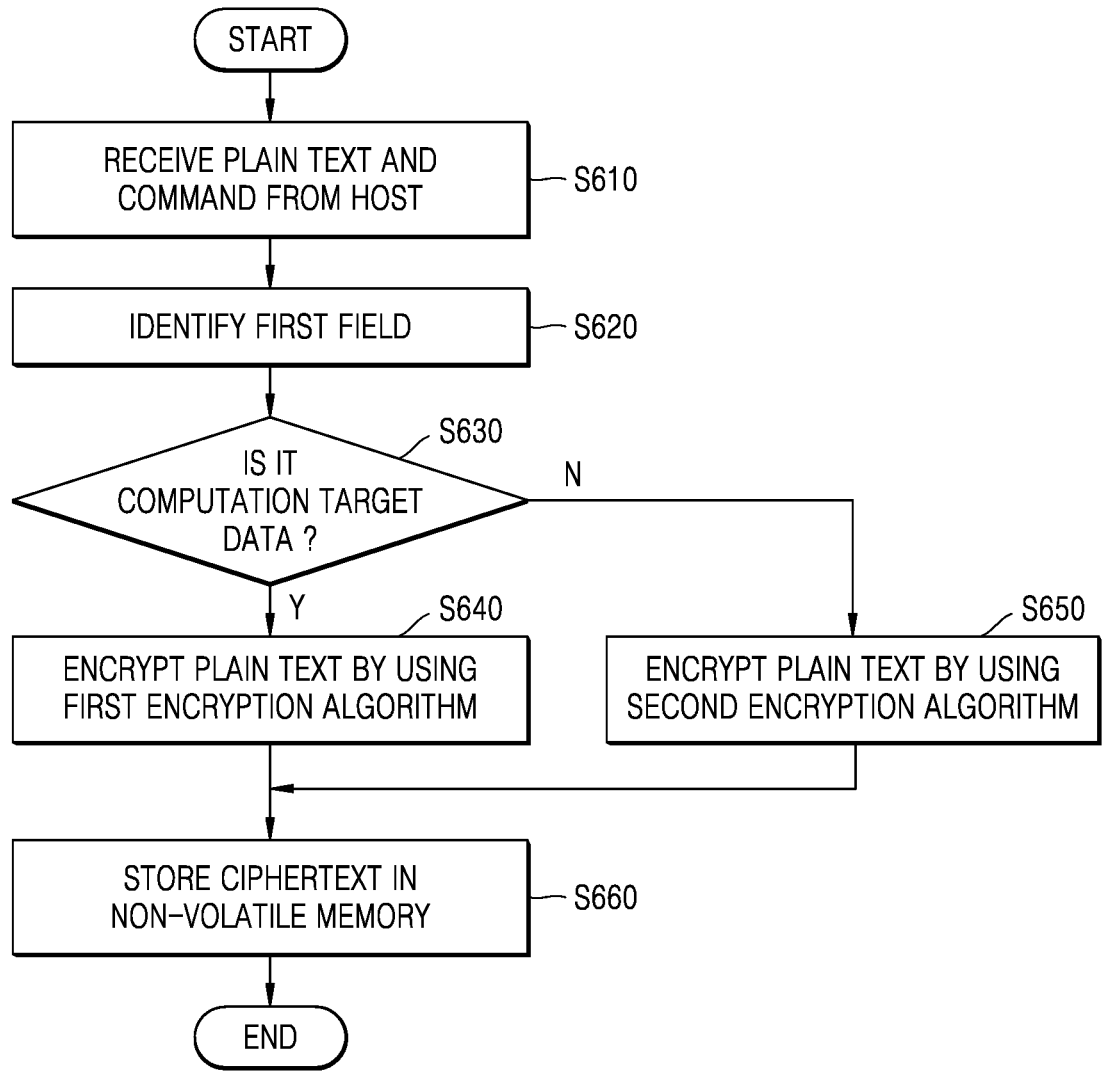
FIG. 5 is a flowchart illustrating an operating method for a storage device according to embodiments of the inventive concept.

FIG. 5 is a flowchart illustrating an operating method for a storage device according to embodiments of the inventive concept. Here, the operating method may be applied to the storage system 2 of FIG. 4.

Referring to FIGS. 4 and 5, the host interface 310 may receive plain text (or unencrypted data) and a command from the host 40 (S610). The command may include a read command or a write command. The command may include a first field indicating whether or not computation on the plain text is performed by the storage device 30. Here, the term "computation" may denote an AI data operation, a learning operation associated with machine learning, or an inference operation associated with machine learning, for example. The computation may be performed by the CPU 331 or the accelerator 332 included in the storage processor 330.

The storage device 30 may identify a first field of the command (S620). In some embodiments, the host interface 310 may identify the first field in relation to a preset bit among bits constituting the command. For example, when a bit constituting the first field among bits constituting the command is "1", the first field may indicate that computation is performed by the storage device 30 on the plain text received from the host 40. Alternately, when the bit constituting the first field among the bits constituting the command is "0", the first field may indicate that no computation is performed by the storage device 30 on the plain text received from the host 40. Although the host interface 310 is assumed to identify the first field in the illustrated example of FIG. 6, in other embodiments of the inventive concept, the storage processor 330 or some other component may be used to identify the first field.

When the plain text is determined to be computation target data (S630=Yes), the first encryption circuit 381 may encrypt the plain text using a first encryption algorithm (S640). In some embodiments, the first encryption circuit 381 may generate a first ciphertext by encrypting the plain text using the first encryption algorithm, and the first ciphertext may be temporarily stored in the buffer memory 390. In some embodiments, computation data may be generated as a result of computation on the first ciphertext. Thereafter, decrypted data may be generated by decrypting the computation data using the first encryption algorithm, and the decrypted data may be the same as the computation performed on the plain text. That is, because the storage device 30 encrypts the plain text (as computational target data) using the first encryption algorithm, the computation on the plain text may be performed by the storage device 30. Accordingly, the storage device 30 not only provides a computation function in relation to the plain text, but also ensures data security of the plain text.

When the plain text is determined to not be computation target data (S630=No), the second encryption circuit 382 may encrypt the plain text using the second encryption algorithm (S650). In some embodiments, the second encryption circuit 382 may generate a second ciphertext by encrypting a plain text using a second encryption algorithm, and the second ciphertext may be temporarily stored in the buffer memory 390. The second encryption algorithm may be a symmetric key algorithm or an asymmetric key algorithm. The second encryption algorithm may provide relatively fast encryption, as compared with the first encryption algorithm. Accordingly, the plain text—while not being target computation data in relation to the storage device 30—may nonetheless be encrypted using the second encryption algorithm. And as a result, the storage device 30 may ensure data security and provide an encryption function, albeit with relatively increased speed.

Then, the storage controller 300 may store a first ciphertext or a second ciphertext generated by the first encryption algorithm or the second encryption algorithm in the NVM 400 (S660). That is, the memory interface 320 may receive the first ciphertext or the second ciphertext from the first encryption circuit 381 or the second encryption circuit 382 and provide the first ciphertext or the second ciphertext to the NVM 400. In some embodiments, the memory interface 320 may also receive the first ciphertext or the second ciphertext temporarily stored in the buffer memory 390 and provide the first ciphertext or the second ciphertext to the NVM 400. The memory interface 320 may also provide a write command to the NVM 400 together with the first ciphertext or the second ciphertext.

Figure 6:
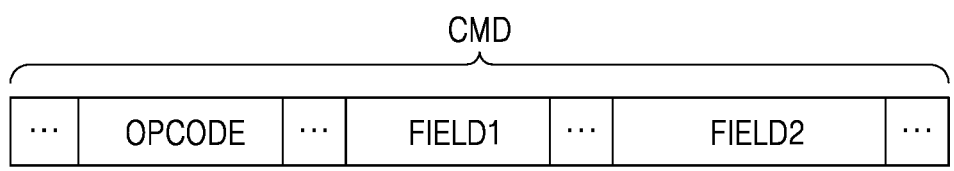
FIG. 6 is a diagram illustrating a command structure according to embodiments of the inventive concept.

FIG. 6 is a conceptual diagram illustrating a data structure for a command according to embodiments of the inventive concept.

Referring to FIGS. 1 and 6, the command CMD may include a plurality of fields. In some embodiments, the command CMD may include an opcode field and a first field. The opcode field may be a field indicating the type of command. For example, the opcode may include information indicating a write command or a read command. Here, although the term "command CMD" is used, the commands or instructions contemplated by various embodiments of the inventive concept may alternately be referred to as requests, queries, packets, etc.

Referring to FIG. 6, the command CMD of FIG. 6 may further include a first field (field1) and a second field (field2). The first field may include information on whether computation on data is performed by the storage device 10. In some embodiments, the first field may consist of a single bit. For example, when the first field includes "1", the storage device 10 may perform an arithmetic operation on data received from the host 20, a learning operation of machine learning, or an inference operation of machine learning. When the first field includes "0", the storage device 10 may not perform the arithmetic operation on the data received from the host 20, the learning operation of machine learning, or an inference operation of machine learning. The second field may include information on whether data received from the host 20 is encrypted. In some embodiments, the second field may consist of one bit. For example, when the second field includes "1", the data received from the host 20 may be an unencrypted plain text, and when the second field includes "0", the data received from the host 20 may be a ciphertext.

When the data received from the host 20 is plain text, the plain text may be encrypted using the first encryption algorithm or the second encryption algorithm as described above in relation to FIGS. 1, 2, 3, 4 and 5. When the data received from the host 20 is a ciphertext, the data received from the host 20 may not be encrypted, and the data may be stored in the NVM 200.

Figure 7A:
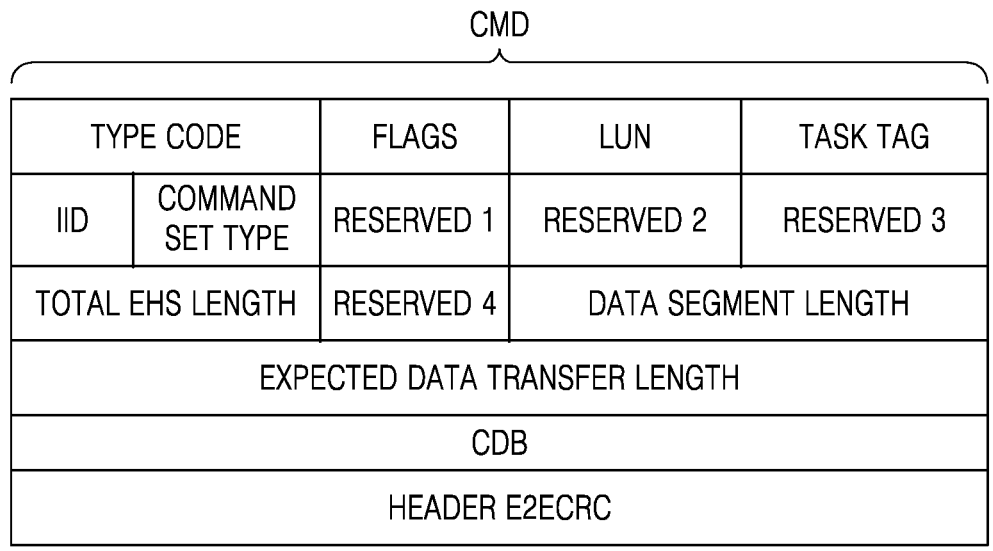
FIGS. 7A and 7B are respective, conceptual diagrams illustrating exemplary commands that may be used in embodiments of the inventive concept.
Figure 7B:
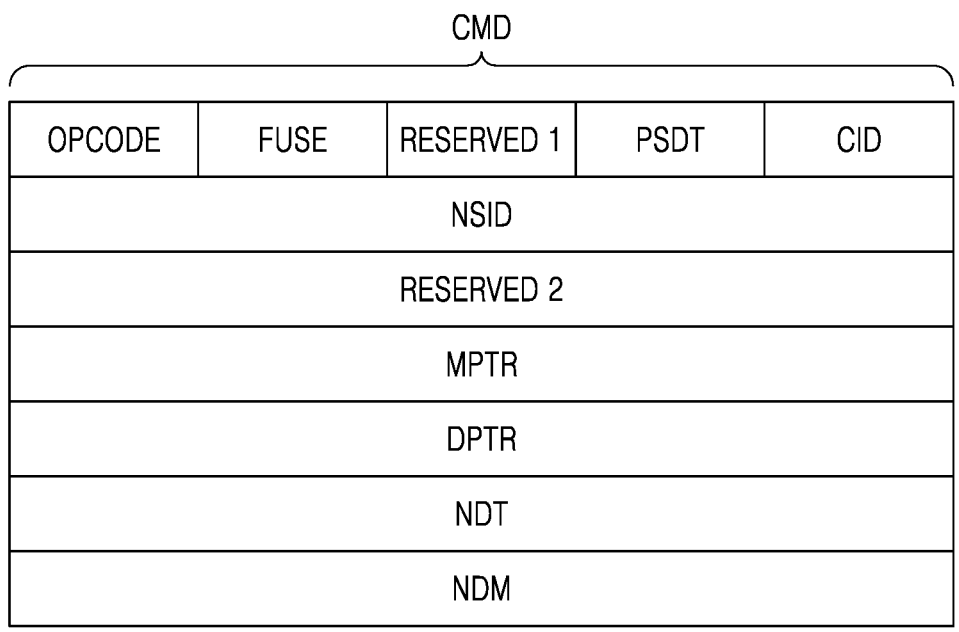

FIGS. 7A and 7B are respective diagrams illustrating examples of possible command data strictures according to embodiments of the inventive concept. Here, FIG. 7A assumes a command supported by a UFS standard, and FIG. 7B assumes a command supported by an NVMe standard.

Referring to FIG. 7A, the command CMD may include a type code field, a flag field, a logical unit number (LUN) field, a task tag field, an initiator identifier (ID) field, a command set type field, first, second, third and fourth reserved fields (reserved 1 to reserved 4), a total extra header segment (EHS) length field, a data segment length field, an expected data transmission length field, a command descriptor block (CDB) field, and a header E2ECRC field.

The type code field may include bits indicating the type of the command CMD. The flag field may include information indicating a direction of data transmission or command priority information. The LUN field may include information on a logical unit number of a device used to communicate a command. The task tag field may include a unique tag value maintained for transactions related to a task. The initiator identifier field may include information on an identifier of a device for communicating a command. The command set type field may include information on a command set defined by a command bit in the CDB field. The total EHS length field may include information indicating sizes of additional header segments. The data segment length field may include information indicating a length of a data segment following the command. The expected data transmission length field may include information on the number of bits communicated to complete a small computer system interface (SCSI) command request. The CDB field may include information on a standard command descriptor block defined by UFS command sets. The header E2ECRC field may include information on a cyclic redundancy check (CRC) result between a device for communicating a command and a device for receiving the command.

In some embodiments, the command CMD of FIG. 7A may include the first field and the second field of FIG. 6. For example, one or more of the first to fourth reserved fields (e.g., reserved 1 to reserved 4) of the command CMD of FIG. 7A may be designated as indicating the first field and the second field (e.g., a first designated bit and a second designated bit). In this manner, for example, distinct fields of the first to fourth reserved fields (e.g., reserved 1 to reserved 4) of the command CMD of FIG. 7A may be used to indicate the first field and the second field of FIG. 6.

Referring to FIG. 7B, the command CMD may include a plurality of fields. That is, the command CMD may include an opcode field, a fuse field, a first reserved field (reserved 1), a PRP or SGL for data transfer (PSDT) field, a command identifier (CID) field, a namespace identifier (NSID) field, a second reserved field (reserved 2), a metadata pointer (MPTR) field, a data pointer (DPTR) field, a number of words in data transfer (NDT) field, a number of words in metadata transfer (NDM) field.

The opcode field may indicate an opcode of a command to be executed. The fuse field may indicate whether a fused operation for combining two commands is performed. The PSDT field may indicate whether information including an address (physical region page (PRP) or a scatter gather list (SGL)) is used for data transmission associated with a command. The CID field may indicate a unique identifier for the command. The YSID field may indicate an identifier of a namespace to which a command is applied. The MPTR field may include an address of an adjacent physical buffer for meta data or an address of an SGL segment. The DPTR field may include data (a PRP entry or an SGL entry) used for a command. The NDT field may indicate the number of data of a unit size (for example, 32 bytes) when communicating data. The NDM field may indicate the number of data of a unit size (for example, 32 bytes) when communicating metadata.

In some embodiments, the command CMD of FIG. 7B may include the first field and the second field of FIG. 6. For example, one or more of the first and second reserved fields (e.g., reserved 1 and reserved 2) of the command CMD of FIG. 7B may be allocated as distinct fields (e.g., the first field and the second field). For example, the first and second reserved fields (e.g., reserved 1 and reserved 2) of the command CMD of FIG. 7B may be used as the first field and the second field of FIG. 6.

Figure 8:
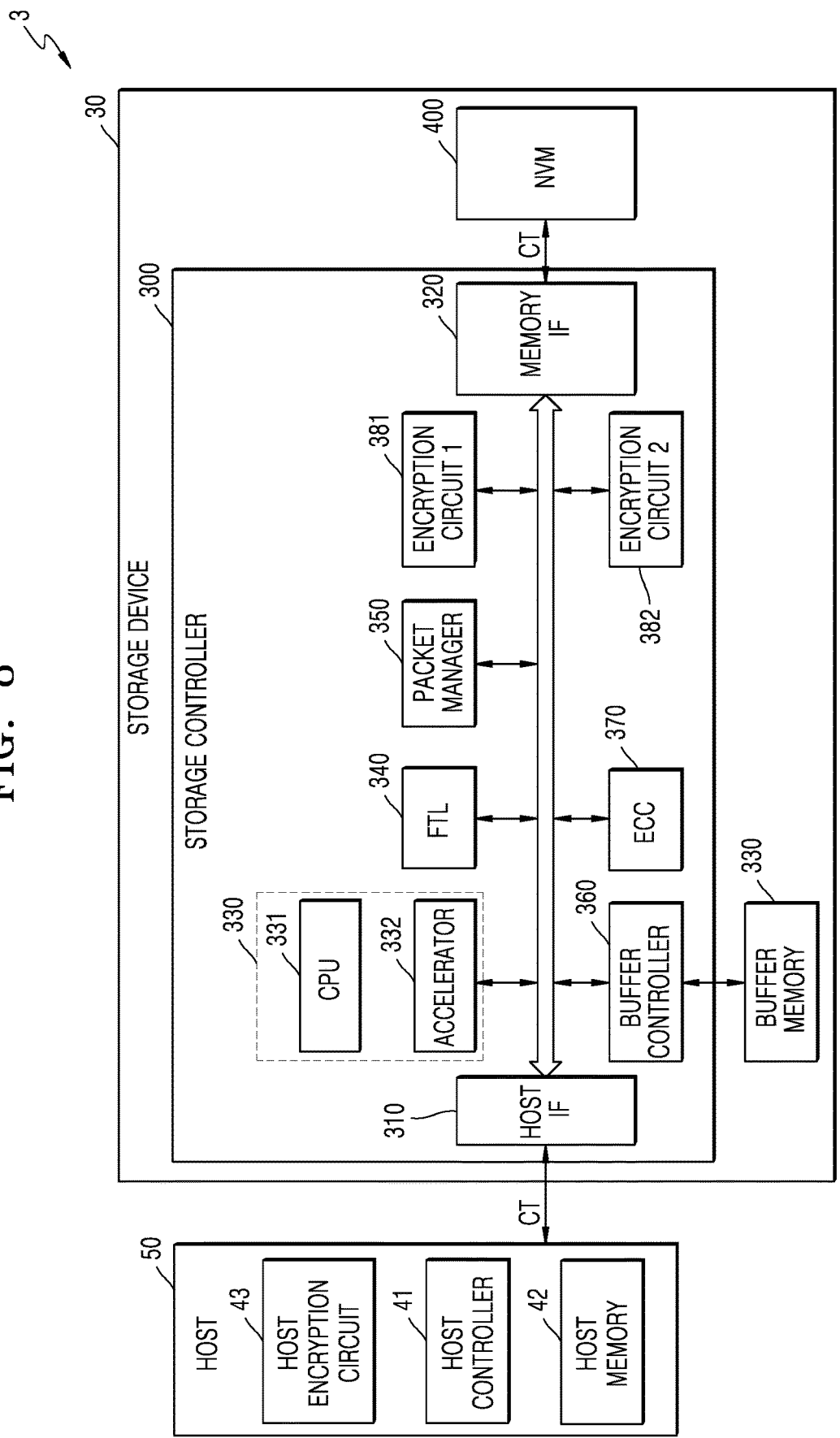
FIG. 8 is a block diagram illustrating a storage system according to embodiments of the inventive concept.

FIG. 8 is a block diagram illustrating a storage system 3 according to embodiments of the inventive concept, and may be compared with the storage system 2 of FIG. 4.

Of particular note, the host 50 of the storage system 3, in contrast to the host 40 of the storage system 2, may additionally include a host encryption circuit 43. Here, the host encryption circuit 43 may generate a ciphertext CT for plain text PT. The ciphertext CT may be provided to the storage device 30. Although not shown in FIG. 8, the host 50 may also provide a command to the storage device 30 together with the ciphertext CT. The command may include a second field as illustrated in FIG. 7. The second field may include information on whether the received data is ciphertext.

The host interface 310 of the storage controller 300 may receive the ciphertext CT and the command, and determine whether the received data is the ciphertext CT based on a second field included in the command. When it is determined that the received data is the plain text PT not the ciphertext CT, the storage device 30 may encrypt the plain text PT by selectively using a first encryption algorithm or a second encryption algorithm as described above with reference to FIGS. 1, 2, 3, 4, and 5. However, when it is determined that the received data is the ciphertext CT, the storage device 30 may store the ciphertext CT in the NVM 400. In some embodiments, the memory interface 320 may be used to store the ciphertext CT in the NVM 400 (e.g., by communicating the ciphertext CT to the NVM 400 in accordance with an appropriate communications protocol).

Figure 9:
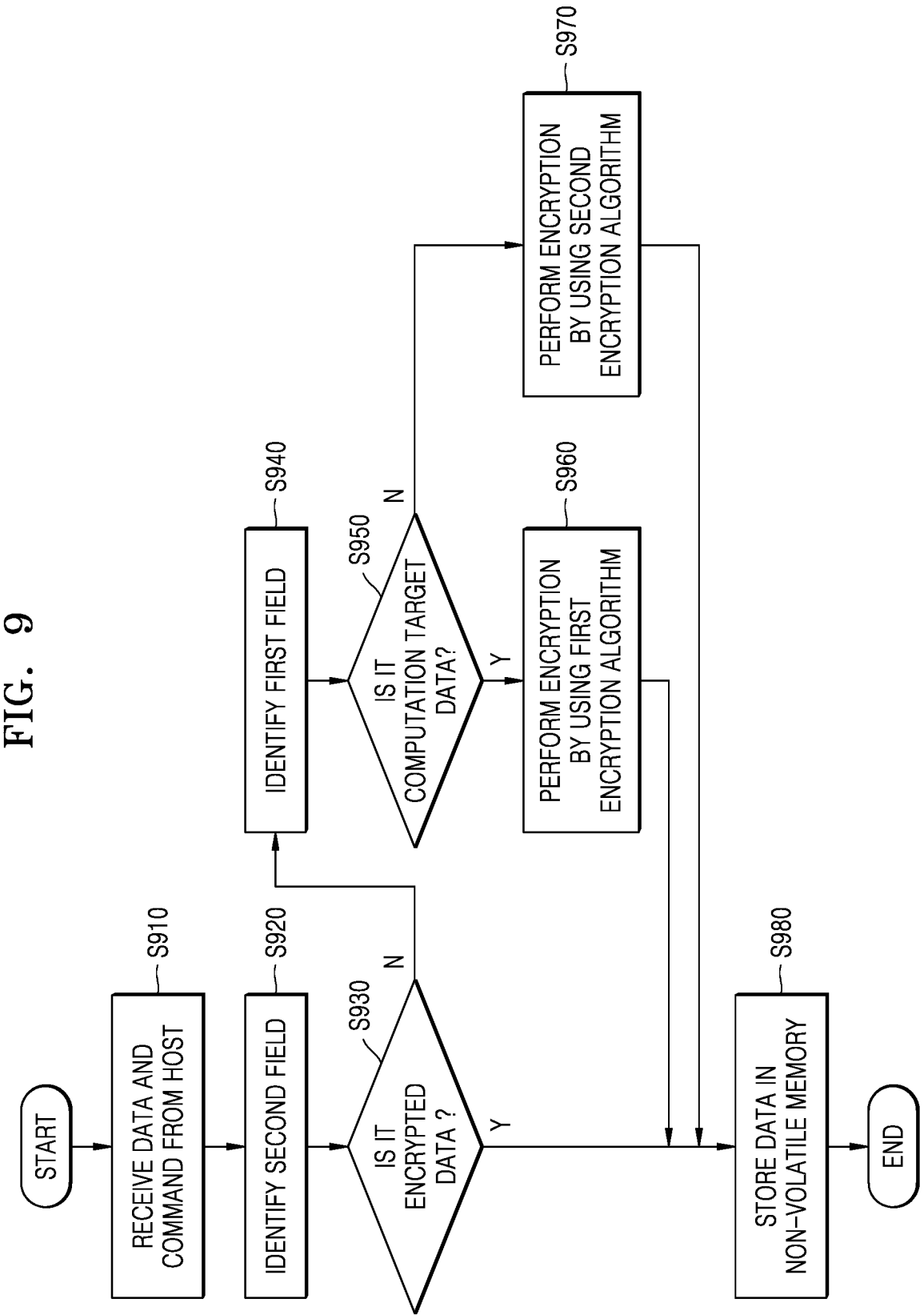
FIG. 9 is a flowchart illustrating an operating method for a storage device according to embodiments of the inventive concept.

FIG. 9 is a flowchart illustrating an operating method for a storage device according to embodiments of the inventive concept. Here, the operating method will be described in relation to the storage system 3 of FIG. 8.

The host interface 310 may receive data (e.g., plain text or a ciphertext) and a command from the host 50 (S910). That is, the host 50 may provide either the ciphertext, as encrypted by the host encryption circuit 43, or the plain text to the host interface 310.

The storage device 30 may then identify a second field included in the command (S920). In some embodiments, the host interface 310 may identify the second field in relation to a second designated bit among a plurality of bits constituting the command. For example, when the second designated bit of the second field is "1", the second field may be deemed to indicate that the data received from the host 50 is the ciphertext. Alternately, when the second designated bit of the command is "0", the second field may be deemed to indicate that the data received from the host 50 is plain text.

Here, it should be noted that in some embodiments, the storage processor 330, or some other computational device, may be used to identify the second field instead of the host interface 310.

When the data is determined to be the ciphertext (S930=Yes), the operating method jumps to step S980. Otherwise, and when the data is determined to be plain text, the storage device 30 may identify a first field of the command (S940). In some embodiments, the host interface 310 may be used to identify the first field through a first designated bit among bits constituting the command. In some embodiment, the step S940 of the operating method of FIG. 9 may be substantially the same as step S620 of the operating method of FIG. 5.

When it is determined that the plain text is computation target data (S950=Yes), the first encryption circuit 381 may encrypt the plain text using the first encryption algorithm. That is, the first encryption circuit 381 may generate a first ciphertext by encrypting the plain text using the first encryption algorithm. In some embodiments, the first encryption algorithm may be a homomorphic encryption algorithm, and the step S960 of the operating method of FIG. 9 may be substantially the same as step the step S640 of FIG. 5. Here, the phrase "computation target data" denotes data that is a target of computational operation performed by the storage device 30.

When it is determined that the plain text is not computation target data (S950=No), the second encryption circuit 382 may encrypt the plain text using the second encryption algorithm (S970). In some embodiments, the second encryption circuit 382 may generate a second ciphertext by encrypting the plain text using the second encryption algorithm. Here, the second encryption algorithm may be a symmetric key algorithm or an asymmetric key algorithm. In some embodiment, the step S970 of the operating method of FIG. 9 may be substantially the same as step S650 of the operating method of FIG. 6.

The storage controller 300 may store the ciphertext in the NVM 400 (S980). That is, the memory interface 320 may store the ciphertext received from the host 50, the first ciphertext generated by the first encryption circuit 381, or the second ciphertext generated by the second encryption circuit 382 in the NVM 400. In this regard, the memory interface 320 may receive the ciphertext, the first ciphertext, or the second ciphertext received from the host 50 and provide the ciphertext, the first ciphertext, or the second ciphertext to the NVM 400.

When receiving the ciphertext from the host 50, the storage device 30 may store the ciphertext in the NVM 400 without further encryption of the ciphertext. And because storage device-based encryption is omitted, data storage speed may be improved. In addition, when receiving the plain text from the host 50, the storage device 30 may encrypt the ciphertext and store the generated ciphertext in the NVM 400. That is, the storage device 30 may provide increased storage speed and improved data security by selectively performing encryption according to whether the data received from the host 50 is plain text or a ciphertext.

Figure 10:
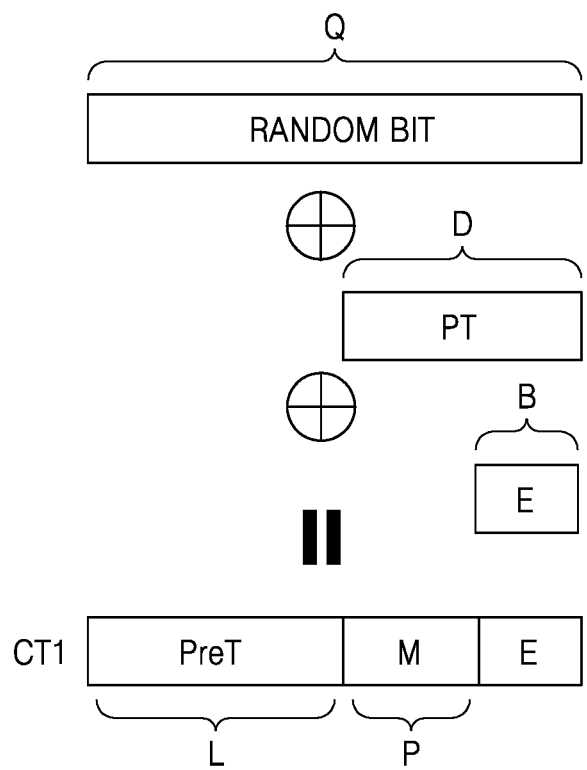
FIG. 10 is a conceptual diagram illustrating an encryption process using a first encryption algorithm according to embodiments of the inventive concept.
Figure 11:
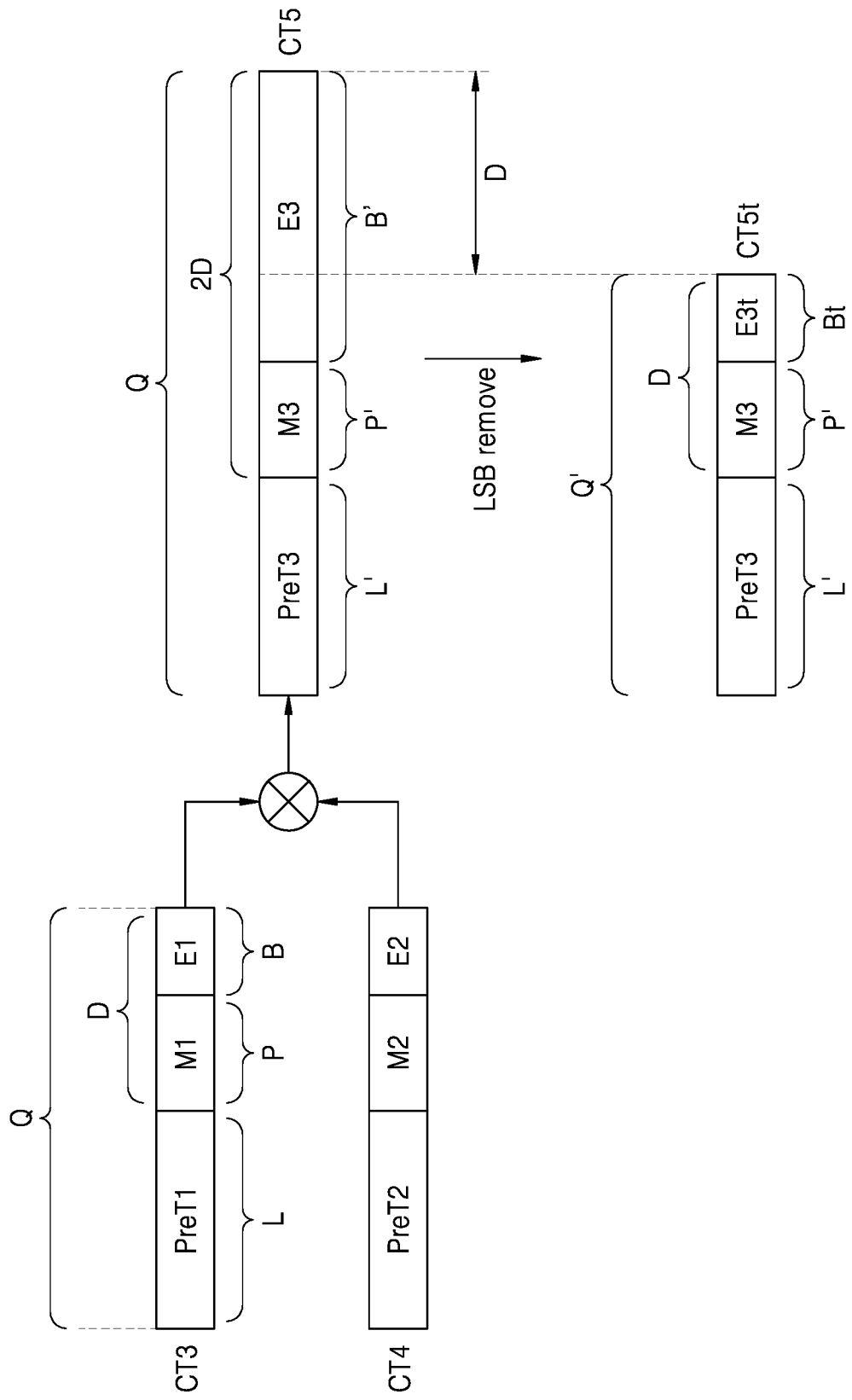
FIG. 11 is a conceptual diagram illustrating computation on a first ciphertext according to embodiments of the inventive concept.

FIG. 10 is a conceptual diagram illustrating an encryption process using the first encryption algorithm according to embodiments of the inventive concept, and FIG. 11 is another conceptual diagram illustrating computation on a first ciphertext according to embodiments of the inventive concept.

Referring to FIGS. 1, 8, 10, and 11, the first ciphertext CT1 may be generated by encrypting the plain text PT using the first encryption algorithm (e.g., a homomorphic encryption algorithm). The encryption process of FIG. 10 may be performed, for example, using a first encryption circuit (e.g., 121 and 381 of FIGS. 1 and 8). In some embodiments, the first ciphertext CT1 may include a preliminary text PreT, a message M, and an error E due to properties of the homomorphic encryption algorithm. The message M may be a valid bit that does not include the error E. Whenever a multiplication operation on a ciphertext is performed, a length of the preliminary text PreT may be reduced. Therefore, when the length of the preliminary text PreT is long, more multiplication operations may be performed on a ciphertext.

The first encryption circuits 121 and 381 may be used to generate the first ciphertext CT1 by adding a random bit having a length Q and the error E having a length B to a plain text PT having a length D. The length D may be less than the length Q and may be greater than the length B. In the first ciphertext CT1, a length of the valid bit may be referred to as P, and a length of the preliminary text PreT may be referred to as L.

Referring to FIGS. 8 and 11, the accelerator 332 may perform a multiplication operation using a third ciphertext CT3 and a fourth ciphertext CT4. Here, the third ciphertext CT3 and the fourth ciphertext CT4 may be ciphertexts encrypted using the first encryption algorithm. Although the multiplication operation is described below in relation to FIG. 11, the accelerator 332 may further perform an addition operation, or some other mathematical or logic operation. Alternately or additionally, the accelerator 332 may also perform an AI operation, a learning operation associated with machine learning, or an inference operation associated with machine learning.

The third ciphertext CT3 may include a first preliminary text PreT1, a first message M1, and a first error E1. The third ciphertext CT3 may be a ciphertext corresponding to a first plain text PT1. A total length of the third ciphertext CT1 may be Q, and a length of the first plain text PT1 may be D. In addition, a length of the first preliminary text PreT1 may be L, a length of the first message M1 representing a valid bit of the first plain text PT1 may be P, and a length of the first error E1 may be B. In addition, the fourth ciphertext CT4 may include a second preliminary text PreT2, a second message M2, and a second error E2. The fourth ciphertext CT4 may be a ciphertext corresponding to a second plain text PT2. A total length of the fourth ciphertext CT4 may be Q, and a length of the second plain text PT2 may be D. In addition, a length of the second preliminary text PreT2 may be L, a length of the second message M2 representing a valid bit of the second plain text PT2 may be P, and a length of the second error E2 may be B.

The accelerator 332 may generate a fifth ciphertext CT5 by performing a multiplication operation with the third ciphertext CT3 and the fourth ciphertext CT4. The fifth ciphertext CT5 may include a third preliminary text PreT3, a third message M3, and a third error E3. A total length of the fifth ciphertext CT5 may be Q, a length of the third preliminary text PreT3 may be L', a length of the third message M3 may be P', and a length of the third error may be B'. Due to a property of the multiplication operation on the homomorphic ciphertext, the length L' of the third preliminary text PreT3 may be less than the length L, the length P' of the third message M3 may be less than the length P, and the length B' of the third error E3 may less than the length B. A result of decrypting the fifth ciphertext CT5 using the first encryption algorithm may be the same as a result of a multiplication operation of the first plain text PT1 and the second plain text PT2.

In some embodiments, the accelerator 332 may obtain a changed third error E3*t* by removing some of lower bits LSB of the third error E3 included in the fifth ciphertext CT5. The number of lower bits to be removed may be set to D. Accordingly, a length Bt of the changed third error E3*t* may be less than the length B'. However, the length Bt of the changed third error E3*t* may be greater than the length B of the first error E1 due to a property of a multiplication operation, and thus, a length of an error included in a ciphertext may be increased as the multiplication operation is repeated. Because a lower bit having a length D is removed from the length Q of the fifth ciphertext CT5, the length Q' of the changed fifth ciphertext CT3*t* may be less than the length Q. In conclusion, as a multiplication operation is repeated, a total length of a ciphertext and a length of a valid bit included in the ciphertext may be reduced, and a length of an error may be increased. A result of decrypting the changed fifth ciphertext CT5*t* using the first encryption algorithm may be the same as a result of a multiplication operation of the first plain text PT1 and the second plain text PT2.

Figure 12:
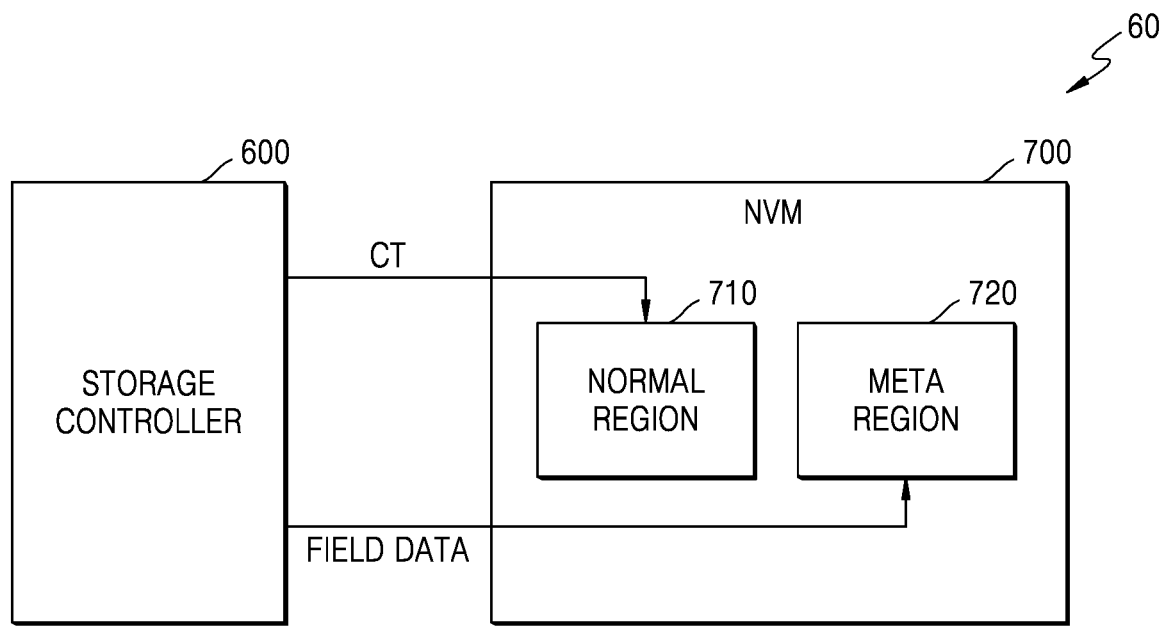
FIGS. 12 and 13 are respective block diagrams illustrating various approaches to storing data according to embodiments of the inventive concept.

FIG. 12 is a block diagram illustrating a method of storing data according to embodiments of the inventive concept. The method of FIG. 12 will be described in relation to the storage system of FIG. 8, wherein a storage controller 600 may be understood as one possible example of the storage controller 300.

Referring to FIGS. 8 and 12, a non-volatile memory (NVM) 700 may include a normal region 710 and a meta region 720. The normal region 710 may store a ciphertext CT, and the meta region 720 may store field data. In some embodiments, the normal region 710 and the meta region 720 may be physically separate.

The storage controller 600 may control the NVM 700 to store the ciphertext CT in the normal region 710. The ciphertext CT may be received from the host 50 or may be generated by a first encryption circuit 381 or a second encryption circuit 382.

The storage controller 600 may control the NVM 700 to store the field data in the meta region 720. The field data may indicate information stored in a first field and/or a second field included in a command received from the host 50. For example, the storage controller 600 may store the ciphertext CT in the normal region 710 and store information related to the first field and/or the second field of the command and further related to the ciphertext CT in the NVM 700. Accordingly, the storage controller 600 may read the data stored in the meta region 720 to determine whether the ciphertext CT is computation target data or whether the ciphertext CT is in an encrypted state when received from the host 50.

Figure 13:
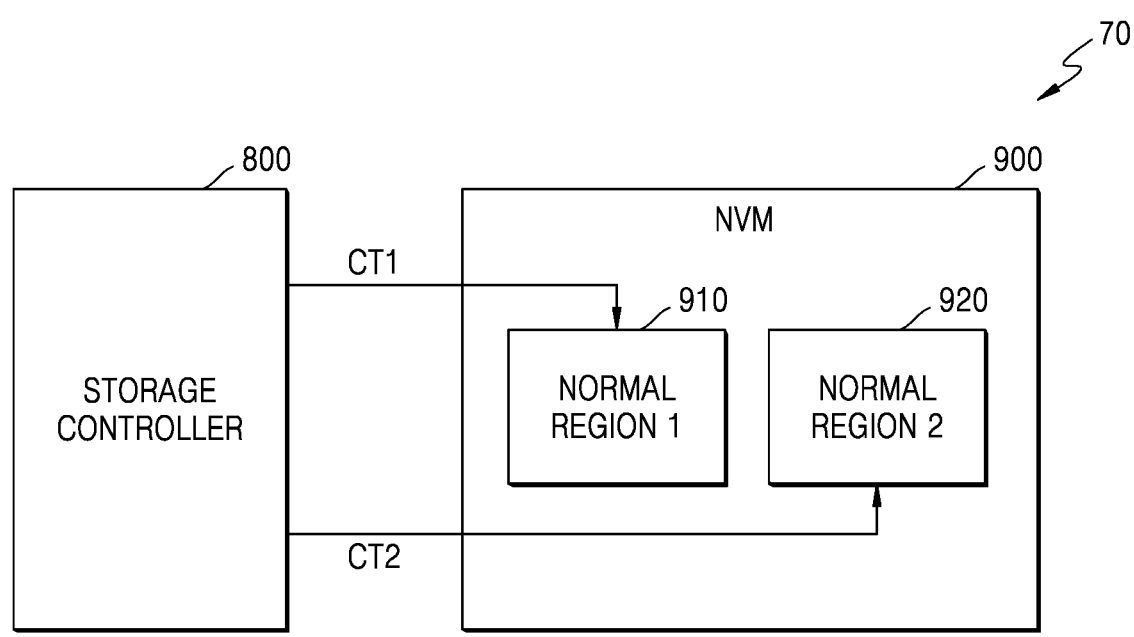

FIG. 13 is a block diagram illustrating a method of storing data according to embodiments of the inventive concept. The method of FIG. 13 will be described in relation to the storage system of FIG. 8, wherein a storage controller 600 may be understood as one possible example of the storage controller 300.

Referring to FIGS. 8 and 13, a non-volatile memory (NVM) 900 may include a first normal region 910 and a second normal region 920. The first normal region 910 may store a first ciphertext CT1, and the second normal region 920 may store a second ciphertext CT2. In some embodiments, the first normal region 910 and the second normal region 920 may be physically separate. The first ciphertext CT1 may indicate a ciphertext encrypted using a first encryption algorithm, and the second ciphertext CT2 may indicate a ciphertext encrypted using a second encryption algorithm. In some embodiments, the first encryption algorithm may be a homomorphic encryption algorithm, and the second encryption algorithm may be a symmetric key or an asymmetric key algorithm.

The storage controller 800 may control the NVM 900 to store the first ciphertext CT1 in the first normal region 910. The first ciphertext CT1 may be generated by the first encryption circuit 381.

The storage controller 800 may control the NM 900 to store the second ciphertext CT2 in the second normal region 920. The second ciphertext CT2 may be generated by the second encryption circuit 382.

The storage controller 800 may determine that the first ciphertext CT1 is encrypted by the first encryption algorithm by reading the first ciphertext CT1 from the first normal region 910 and may determine that the second ciphertext CT2 is encrypted by the second encryption algorithm by reading the second ciphertext CT2 from the second normal region 920.

Figure 14:
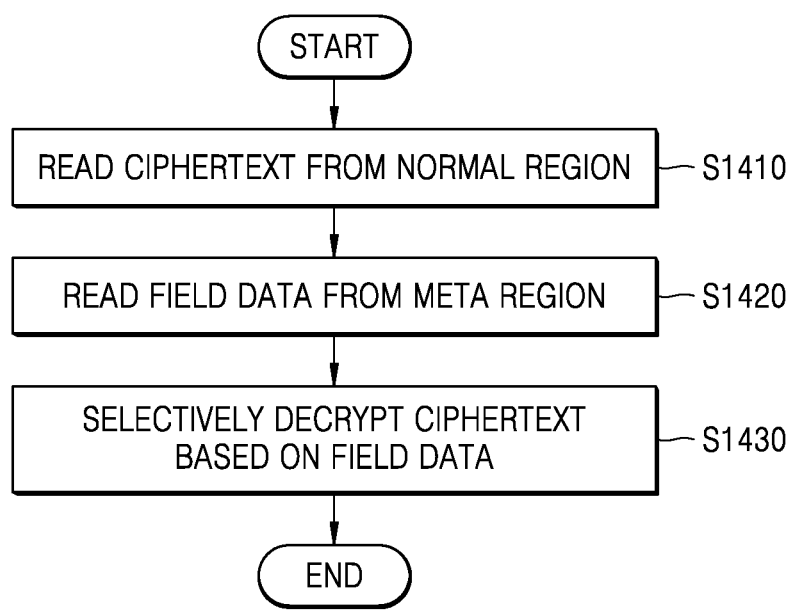
FIG. 14 is a flowchart illustrating an operating method for a storage device according to embodiments of the inventive concept.

FIG. 14 is a flowchart illustrating an operating method for a storage device according to embodiments of the inventive concept Referring to FIGS. 9, 12 and 14 the storage controller 600 may read a ciphertext CT from the normal region 710 (S1410). That is, the storage controller 600 may obtain the ciphertext CT by reading data from a region corresponding to an address received from the host 50 among the normal region 710.

The storage controller 600 may read field data from the meta region 720 (S1420). That is, the storage controller 600 may read field data corresponding to the read ciphertext. The field data may include information related to the first field and/or information related to the second field. For example, the information related to the first field may indicate whether the ciphertext CT is computation target data, and the information related to the second field may indicate whether the ciphertext CT is in an encrypted state when received from the host 50.

The storage controller 600 may selectively decrypt the ciphertext CT based on the field data (S1430). That is, when the second field indicates that the ciphertext CT is in an encrypted state when received from the host 50, the storage controller 600 may omit decryption of the ciphertext CT. The storage controller 600 may provide the ciphertext CT to the host 50. When the second field indicates that the ciphertext CT is unencrypted when received from the host 50, the storage controller 600 may decrypt the ciphertext CT based on the information on the first field. When the information on the first field indicates that the ciphertext CT is computation target data, the storage controller 600 may generate plain text by decrypting the ciphertext CT according to the first encryption algorithm. When the information on the first field indicates that the ciphertext CT is not the computation target data, the storage controller 600 may generate a plain text by decrypting the ciphertext CT according to the second encryption algorithm. The storage controller 600 may provide the generated plain text to the host 50.

Figure 15:
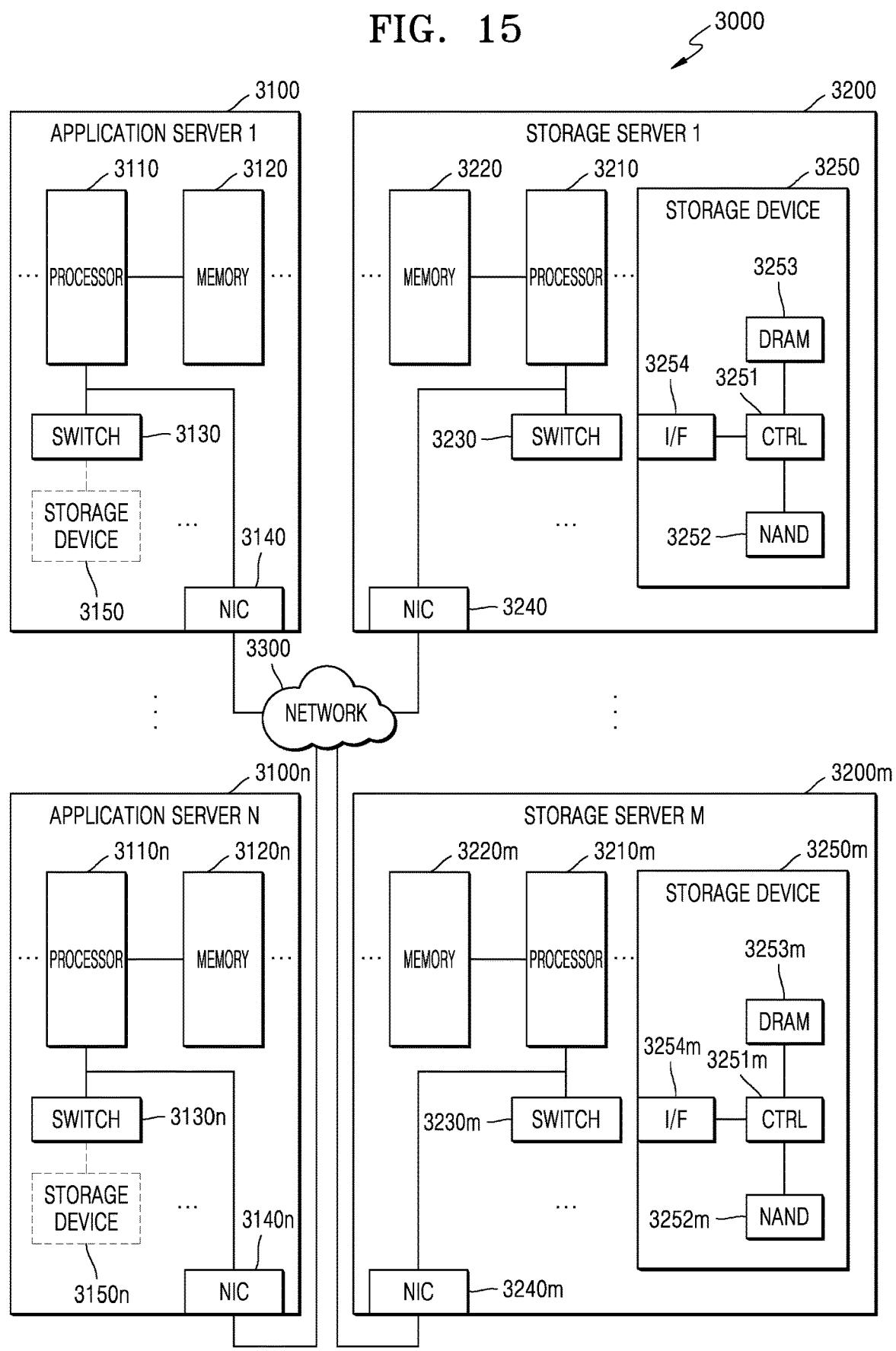
FIG. 15 is a block diagram illustrating a data center including a storage device according to embodiments of the inventive concept.

FIG. 15 is a block diagram of a data center 3000 that may incorporate one or more storage device(s) according to embodiments of the inventive concept.

Referring to FIG. 15, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100*n* and storage servers 3200 to 3200*m*. The number of application servers 3100 to 3100*n* and the number of storage servers 3200 to 3200*m* may be variously selected according to embodiments. The number of application servers 3100 to 3100*n* may be different from the number of storage servers 3200 to 3200*m*.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100*n* may communicate with the storage servers 3200 to 3200*m* through a network 3300. The network 3300 may be implemented using a fiber channel (FC) or Ethernet. In this case, the FC may be a medium used for relatively high-speed data transmission and use an optical switch with high performance and high availability. The storage servers 3200 to 3200*m* may be provided as file storages, block storages, or object storages according to an access method of the network 3300.

In an embodiment, the network 3300 may be a storage-dedicated network, such as a storage area network (SAN). For example, the SAN may be a fiber channel (FC)-SAN implemented in accordance with one or more FC protocols (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternately, the application server 3100 may access memories 3220 to 3220m or storage devices 3250 to 3250m, which are included in the storage servers 3200 to 3200m, through the network 3300. Each of the storage devices 3250 to 3250m may be implemented as storage device 10, 30, 60 or 70 of FIGS. 1, 5, 8, 12 and/or 13. The application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC(Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200m or the application servers 3100 to 3100n, a processor may communicate a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed and may include cyclic redundancy code (CRC) information. The data may be data encrypted for security or privacy.

Storage devices 3150 to 3150n and 3250 to 3250m may communicate a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

While the inventive concept has been particularly shown and described with reference to embodiments thereof, it will be understood that various changes in form and details may be made therein without departing from the spirit and scope of the following claims.

What is claimed is:
1. An operating method for a storage device including a storage controller and a non-volatile memory, the operating method comprising:
receiving a command including data and a field related to the data from a host;
determining an operation mode based on the command;

selectively encrypting the data based on the operation mode to generate selectively encrypted data; and storing the selectively encrypted data in the non-volatile memory, wherein selectively encrypting of the data includes encrypting the data based on a first encryption algorithm that is a homomorphic encryption algorithm subsequent to determining that the operation mode is a first operation mode, or encrypting the data based on a second encryption algorithm different from the first encryption algorithm subsequent to determining that the operation mode is a second operation mode, and wherein determining the operation mode in response to the command includes:

identifying one of a first field indicating whether computation on the data is performed by the storage controller and a second field indicating whether the data included in the command is encrypted data, and determining the operation mode based on the identified one of the first field and the second field.

2. The operating method of claim 1, wherein storing the selectively encrypted data in the non-volatile memory includes storing information related to the field in the non-volatile memory, and the information related to the field indicates at least one of the first operation mode and the second operation mode.

3. The operating method of claim 1, further comprising:

receiving a read command from the host;

reading data corresponding to the read command from the non-volatile memory to generate read data;

selectively decrypting the read data using an encryption algorithm corresponding to the read data to generate decrypted data; and providing the decrypted data to the host, wherein selectively decrypting of the read data includes decrypting the read data using the first encryption algorithm subsequent to determining that the operation mode is the first operation mode, or decrypting the read data using the second encryption algorithm subsequent to determining that the operation mode is the second operation mode.

4. The operating method of claim 1, further comprising:

loading data encrypted using the first encryption algorithm from the non-volatile memory into a buffer memory; and generating, by the storage controller, a learning parameter by performing a training operation associated with machine learning using the data loaded into the buffer memory.

5. The operating method of claim 4, further comprising:

receiving inference target data from the host;

encrypting the inference target data using the first encryption algorithm;

generating output data based on the encrypted inference target data and the learning parameter; and providing the output data to the host.

6. The operating method of claim 1, wherein the determining of the operation mode based on the identified one of the first field and the second field includes:

determining the operation mode as the first operation mode when the second field indicates that the data is non-encrypted data and the first field indicates that a training operation or an inference operation is to be performed on the data;

determining the operation mode as the second operation mode when the second field indicates that the data is non-encrypted data and the first field indicate that an arithmetic operation is not to be performed on the data; and determining the operation mode as a third operation mode when the second field indicates that the data is encrypted data.

7. The operating method of claim 6, further comprising:

storing the data in the non-volatile memory without performing encryption of the data when the operation mode is the third operation mode.

8. An operating method for a storage controller configured to control operation of a non-volatile memory, the operating method comprising:

receiving, from a host, a command including data and at least one of a first field indicating whether computation on the data is to be performed by the storage controller and a second field indicating whether the data is encrypted data;

selectively encrypting the data using either a first encryption algorithm or a second encryption algorithm to generate selectively encrypted data based on the first field and the second field, wherein the first encryption algorithm is a homomorphic encryption algorithm and the second encryption algorithm is one of a symmetric key encryption algorithm and an asymmetric key encryption algorithm; and storing the selectively encrypted data in the non-volatile memory.

9. The operating method of claim 8, wherein the selectively encrypting of the data includes:

determining to store the data in the non-volatile memory when the second field indicates that the data is encrypted data;

encrypting the data to generate the selectively encrypted data using the first encryption algorithm when the second field indicates that the data is unencrypted data and the first field indicates that computation on the data is to be performed; or encrypting the data to generate the selectively encrypted data using the second encryption algorithm when the second field indicates that the data is unencrypted data and the first field indicates that computation on the data is not to be performed.

10. The operating method of claim 8, wherein the storing of the selectively encrypted data in the non-volatile memory includes:

storing the data in the non-volatile memory when the second field indicates that the data is encrypted data; or storing the selectively encrypted data encrypted by one of the first encryption algorithm and the second encryption algorithm in the non-volatile memory when the second field indicates that the data is unencrypted data.

11. The operating method of claim 10, further comprising:

reading the selectively encrypted data, as encrypted by the first encryption algorithm, from the non-volatile memory; and performing an arithmetic operation based on the selectively encrypted data, as encrypted by the first encryption algorithm.

12. The operating method of claim 10, wherein the storing of the selectively encrypted data in the non-volatile memory further includes:

storing the selectively encrypted data as encrypted by the first encryption algorithm in a first region of the non-volatile memory; or storing the selectively encrypted data as encrypted by the second encryption algorithm in a second region of the non-volatile memory.

13. The operating method of claim 8, wherein the storing of the selectively encrypted data in the non-volatile memory includes:
   storing the selectively encrypted data in a third region of the non-volatile memory; and
   storing information related to at least one of the first field and the second field in a fourth region of the non-volatile memory.

14. The operating method of claim 13, further comprising:
   reading the selectively encrypted data from the third region;
   reading the information related to at least one of the first field and the second field from the fourth region; and
   decrypting the selectively encrypted data based on the information related to at least one of the first field and the second field.

15. A storage controller for a storage system, the storage controller comprising:
   a first encryption circuit configured to encrypt data using a first encryption algorithm to generate first encrypted data;
   a second encryption circuit configured to encrypt data using a second encryption algorithm to generate second encrypted data; and
   a first interface circuit configured to receive a command and data from a host, and communicate the data to one of the first encryption circuit, the second encryption circuit and a second interface circuit based on a first field and a second field included in the command, the first field indicating whether computation on the data is to be performed by the storage controller and the second field indicating whether the data is encrypted data,
   wherein the first encryption algorithm comprises a homomorphic encryption algorithm, and the second encryption algorithm is different from the first encryption algorithm, and
   wherein the second interface circuit is configured to communicate at least one of the first encrypted data, the second encrypted data and third encrypted data to a non-volatile memory.

16. The storage controller of claim 15, wherein the first encryption algorithm is a homomorphic encryption algorithm, and
   the second encryption algorithm is one a symmetric key encryption algorithm and an asymmetric key encryption algorithm.

17. The storage controller of claim 16, further comprising:
   an accelerator circuit configured to perform an arithmetic operation using the first encrypted data.

18. The operating method of claim 8, further comprising determining an operation mode in response to the command, including:
   identifying, in the command, one of the first field indicating whether computation on the data is performed by the storage controller and the second field indicating whether the data included in the command is encrypted data, and
   determining the operation mode based on the identified one of the first field and the second field.

19. The storage controller of claim 15, wherein the first interface circuit is configured to determine an operation mode in response to the command, including:
   identifying one of the first field indicating whether computation on the data is performed by the storage controller and the second field indicating whether the data included in the command is encrypted data; and
   determining the operation mode based on the identified one of the first field and the second field.

* * * * *